United States Patent [19]

Steinke

[11] Patent Number: 5,687,763

[45] Date of Patent: Nov. 18, 1997

[54] FLUID FLOW CONTROL DEVICE

[75] Inventor: Joseph H. Steinke, Mission Viejo, Calif.

[73] Assignee: Control Components Inc., Rancho Santa Margarita, Calif.

[21] Appl. No.: 599,745

[22] Filed: Feb. 12, 1996

[30] Foreign Application Priority Data

Feb. 14, 1995 [GB] United Kingdom ............... 9502836

[51] Int. Cl.$^6$ ......................................... F16K 47/04
[52] U.S. Cl. ................................. 137/625.33; 251/127
[58] Field of Search ........................ 137/625.33; 251/127

[56] References Cited

U.S. PATENT DOCUMENTS 4,938,450  7/1990  Tripp et al. ............... 137/625.3 X

FOREIGN PATENT DOCUMENTS

2728697  1/1979  Germany ................... 137/625.3

*Primary Examiner*—John Fox
*Attorney, Agent, or Firm*—Cushman Darby & Cushman IP Group Pillsbury Madison & Sutro LLP

[57] ABSTRACT

A fluid flow control device for use in a variable fluid restrictor control valve or severe service control valve. These valves employ a moveable plug and are used to control high pressure fluids e.g. superheated steam. The control device of the invention includes annular discs with fluid passageways through them. Pairs of discs together form a radial passageway for fluid between the interior of a stack of discs and its radially outer circumference. The passageways may have a smaller cross-section at a mid-region of the disc than at the radially inner or outer side of the disc.

10 Claims, 6 Drawing Sheets

FLUID FLOW CONTROL DEVICE

FIELD OF THE INVENTION

This invention relates to a fluid flow control device. It may be used to control the flow of liquids or gases and may, for example, be used to provide velocity control of high pressure flowing fluids. Devices of this general type are sometimes known as variable fluid restrictor control values, and are exemplified by Self U.S. Pat. Nos. 3,451,404 and 3,514,074 which have frictional passageways, and by Self U.S. Pat. No. 3,513,864 which has multiple abrupt, angular turn passageways.

BACKGROUND OF THE INVENTION

In the handling of flowing high pressure fluids, it has been customary to utilise orifice means having a high velocity short throat section to attain energy losses or high pressure drops. If the fluid is in a liquid state and liable to flash, that is, vaporise or turn to a gaseous condition on the downstream side of the orifice or valve opening, it may condense implosively and induce damaging shock waves, cause erosion, and the like. Also, as the velocity of the fluid in the valve exceeds the velocity of the fluid in the line, several disturbing reactions occur. A most serious problem is rapid erosion of the valve surfaces by direct impingement of the liquid and any foreign particle suspended therein. Additional erosion results from cavitation. Cavitation may be defined as the high speed implosion of vapour against those internal parts of the valve controlling flow (the valve trim) and the valve body.

In addition to the severe problems resulting from erosion, the increased velocity also causes the flow characteristics of the valve to become unpredictable and erratic.

Other problems created by the high fluid velocity in the valve are severe noise generation, trim fatigue and possible degradation of flowing fluid materials such, for example, as polymers.

Fluid-borne noise downstream of control valves is often very high. If not treated or contained with the pipe, this noise can result in sound pressure levels of 110 to 170 dB three feet from the valve exit. Sound sources of this magnitude are hazardous to personnel and frequently result in complaints from local residents.

Mufflers and silencers can typically only attenuate fluid-borne noise 20 to 30 dB. Therefore, only partial success has been achieved with them in obtaining desired sound pressure levels.

Furthermore, a typical path treatment system ie, the muffler, lagging support structure etc is very cumbersome and expensive, often, the total cost of path treatment for noise can exceed the valve cost many times over.

In order to overcome or ameliorate the above problems, there have been introduced devices which effect energy losses in high pressure fluids without increasing velocity and shock wave reaction by sub-dividing the flow into a plurality of small, long passageways with abrupt turns creating friction and pressure drop in the fluid, thus avoiding damage and erosion in the equipment. Such a device is disclosed, for example, in U.S. Pat. No. Re. 32,197. There, the passageways are provided in an annular stack of separate members having abutting faces enclosing a plurality of individual passageway grooves which are angular between the inlet and outlet of the stack to turn the fluid and to provide a substantially longer flow length than between the inlet and outlet ends of the stack. The stack is mounted in the fluid passage of a valve housing and a valve plug movable within the annular structure controls the number of passageways in the stack through which the fluid can flow.

A modified device of this type is disclosed in GB-A-2, 273,579 in which at least one passageway in the stack of members of discs includes a void between the inlet and outlet region of the disc, the void expanding the cross-sectional area of the energy loss passageway.

Valves incorporating a flow control device including a stack of discs having energy-loss passageways have become very successful commercially and it is an object of the present invention to provide an improvement in devices of this type.

SUMMARY OF THE INVENTION

According to the invention a fluid flow control device comprises a plurality of pairs of annular discs forming a rigid structure which incorporates a series of substantially radial passageways for fluid flow, each disc of said pair having passageways therein which extend only partially through said disc in a radial direction, the pair of discs being aligned with one another such that the passageways in one disc interconnect with the passageways in the other disc of the pair so as to provide for fluid flow through the pair of discs.

The invention further provides a fluid flow control device comprising a plurality of discs forming a rigid structure which incorporates a series of passageways for fluid flow, the discs having abutting surfaces and passageways therebetween for fluid flow, inlet means formed in said discs to define a predetermined inlet area for conducting fluid to the series of passageways formed by said rigid structure, outlet means associated with said inlet means to provide a series of openings for exhausting fluid from the passageways, and wherein at least one of the passageways is of smaller cross-section in a mid-region of its respective discs and increases in cross-section from said mid-region towards the inlet and towards the outlet region of said discs.

The invention also provides a pair of discs for incorporation in a structure as defined in the immediately preceding paragraph, each disc containing a radially-extending series of holes through its thickness, and the series of holes being different in the two discs, so that the discs may be superimposed with their holes overlapping, the overlapped holes providing radial flow passageways through the superimposed pair of discs, wherein the passageways are of smaller cross-section in a mid-region of the discs and increasing in cross section from said mid-region towards the centre and towards the outer peripheries of the discs.

The discs may be annular and the passageways increase in cross-section from the mid-region of the annuli towards their inner and outer peripheries.

The discs of the superimposed pair may be identical so that each disc comprises at least two different radially-extending series of holes and the discs are rotated relative to each other so that a first series of holes of one disc is superimposed on a second series of holes of the other disc and vice versa.

Each adjacent pair of discs in a stack of discs may be provided with a flow passageway having the smaller cross-section in the mid-region or, if desired, the invention may be applied to a proportion only of the discs in the structure.

The discs are preferably annular so that the rigid structure or stack formed from the discs contains a central passageway in which a reciprocating valve plug may move to increase or decrease, as desired, the number of flow passages open through the stack. The inlets to the passageways may be at the inner circumference of the discs with the outlets at the outer circumference or, alternatively, the outlets may be at the inner circumference and the inlets at the outer circumference.

The invention in this aspect provides a bidirectional flow path through the device. It is particularly useful, therefore, for the regulation of fluid flow both in and out of, for example, a storage system, e.g. an underground gas storage system. A valve incorporating a flow device according to this aspect of the invention may, therefore, advantageously replace two valves conventionally used, i.e. one for injection and one for withdrawal of the fluid, e.g. natural gas into and from an underground storage.

In another aspect the invention provides a fluid flow control device comprising a plurality of discs forming a rigid structure which incorporates a series of passageways for fluid flow, the discs having abutting surfaces and passageways therebetween for fluid flow, and wherein each disc has at least one first passageway formed through the entire thickness of the disc and extending from the outer edge of the disc to end in a mid-region of the disc and at least one second passageway formed through the entire thickness of the disc and extending from the inner edge of the disc to end in a mid-region of the disc, adjacent pairs of discs being orientated so that each first passageway of one disc communicates with a second passageway of the other disc and each second passageway of said one disc communicates with a first passageway of said other disc.

The invention also provides a disc suitable for incorporation in a structure according to the immediately preceding paragraph, the disc having at least one first passageway formed through the entire thickness of the disc and extending from the outer edge of the disc to end in a mid-region of the disc and at least one second passageway formed through the entire thickness of the disc and extending from the inner edge of the disc to end in a mid-region of the disc.

By appropriate orientation of each pair of discs in the stack, each pair of discs may provide one or more passageways isolated from the passageways provided by other pairs of discs in the stack.

The passageways so defined may be designed to have abrupt turns to create drag and pressure drop in a fluid. They may be of smaller cross-section in the mid-region of the disc—as defined in the first aspect of the present invention. Alternatively or additionally, they may increase in section so as to provide an expanding volume from inlet to outlet so as to provide a desired reduction in energy of fluid flowing through the passageways. In another embodiment the passageways may define a void between the inlet and outlet to expand the cross-sectional area of the passageway as disclosed in GB-A-2,273,579.

The discs defined by the second aspect of the invention are particularly advantageous in that the passageways are easier to machine. Thus they may be wire EDM-or water jet-machined through the thickness of the disc and discs of carbide or ceramic material may be machined without the need for special tooling.

BRIEF DESCRIPTION OF THE DRAWINGS

Embodiments of the invention will now be described by way of example only with reference to the accompanying drawings in which.

DESCRIPTION OF THE PREFERRED EMBODIMENTS

Figure 1:
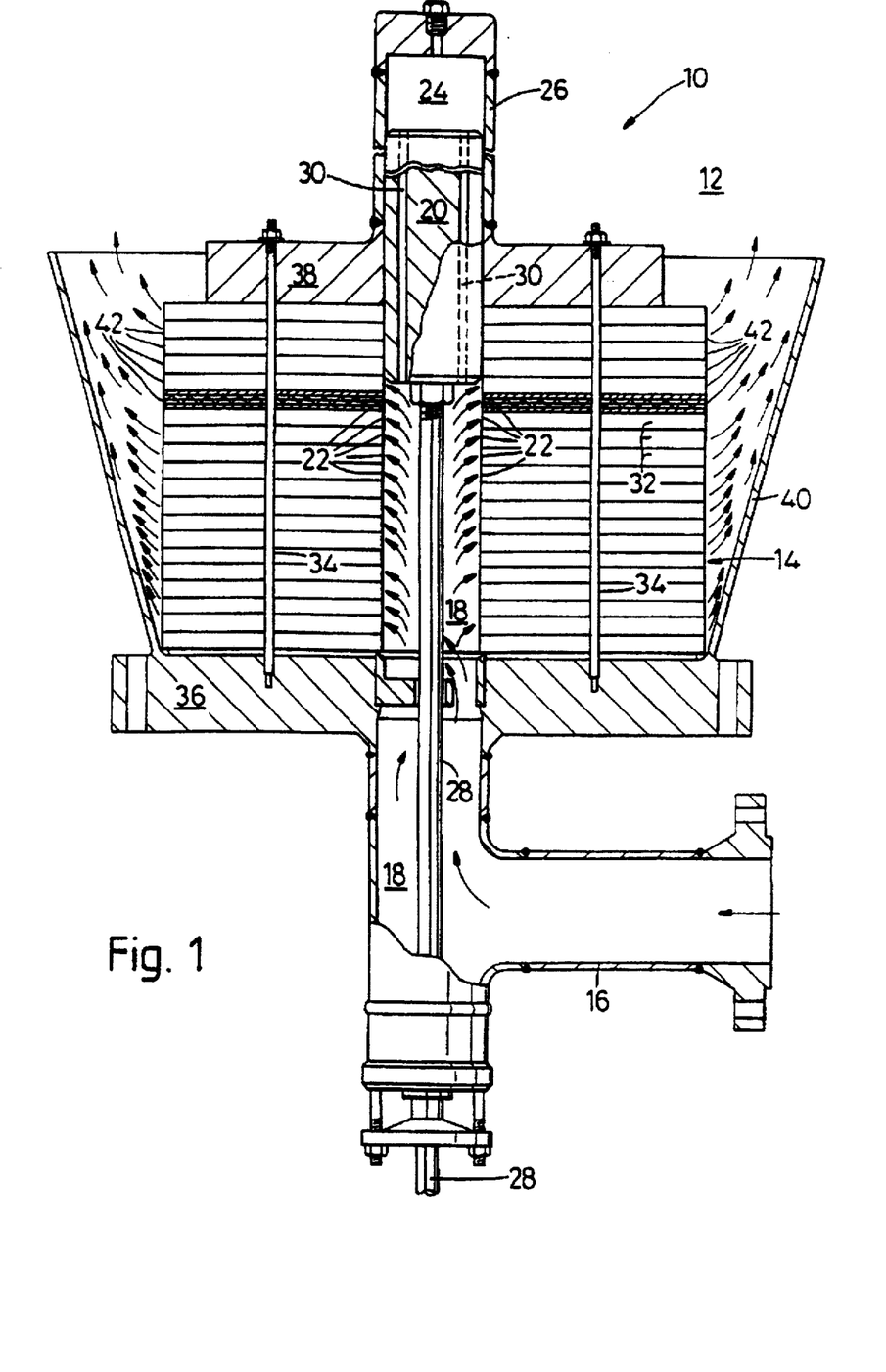
FIG. 1 is a longitudinal cross-section of a valve utilising a flow control device of the present invention.

FIG. 1 discloses a fluid exhaust valve assembly 10 for exhausting, e.g. a predetermined amount of steam, to the atmosphere 12 through an inlet 16. The fluid flows into a chamber 18 from which a predetermined amount of the fluid is allowed to exhaust through the stack assembly 14 by a movable valve plug 20. The valve plug 20 is movable between a first position completely blocking the fluid from entering the stack assembly 14 by completely blocking all the inlets 22 of the stack assembly 14 and a second position opening all the inlets 22 by moving up into a space 24 formed by a top casing 26 of the valve assembly 10. The plug 20 is moved by a connecting rod 28 connected to an actuator (not shown) which is responsive to system control signals in a well-known manner. To minimise the force that the actuator has to exert to move the plug 20 between positions, fluid pressure is balanced across the plug 20 by providing a pair of passageways 30 extending longitudinally across the plug 20 for fluid communication between the chamber and the space 24.

The disc stack assembly 14 includes a series of individual discs 32 which are aligned with respect to the plug 20 and are clamped together by tension rods 34 between a bottom mounting plate 36 to encompass the stack assembly 14 and safely direct the fluid exiting from outlets 42 of the stack assembly up into the atmosphere. The disc stack assembly provides a labyrinth for the fluid as it travels from the inlets 22 to the outlets 42 by means of variously configured discs 32 as it will be described below.

Figure 2A:
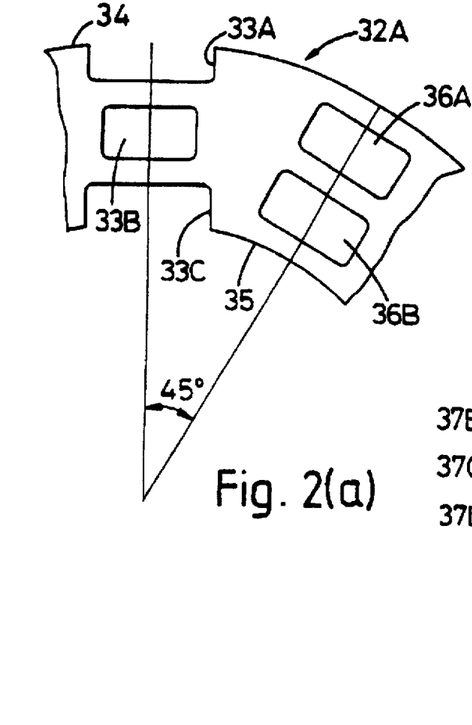
FIG. 2a) is a plan view of a portion of one form of disc according to one aspect of the invention for use, for example, in the flow control device of FIG. 1.

In FIG. 2a) an annular disc 32A has two repeating series of radially-extending, generally rectangular holes through it. Series 33 comprises a slot 33A at the outer periphery 34, an intermediate hole 33B of smaller transverse dimensions than slot 33A and a slot 33C at the inner periphery 35 of the disc. Slot 33C is of similar dimensions to slot 33A. The second series of holes is positioned radially at 45° to the first series. The second series comprises two holes 36A and 36B, again of generally rectangular form. Holes 36A and 36B are intermediate in transverse dimensions between slots 33A and 33C on the one hand and hole 33B on the other hand. They are also radially centred to lie between the radial centres of the holes of the first series. The two series (only one of each being shown) alternate at 45° intervals around the disc.

Figure 2B:
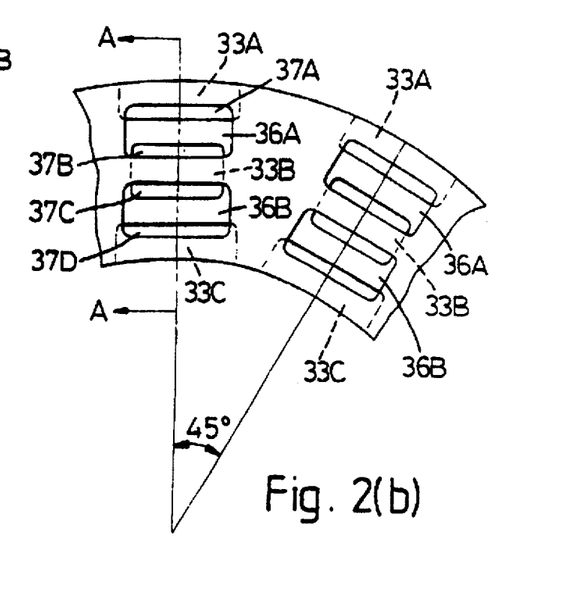
FIG. 2b) is a plan view of a portion of a pair of discs of the type shown in FIG. 2a) superimposed one upon the other.

FIG. 2b) shows two discs according to FIG. 2a), one of which has been rotated at 45° with respect to the other and the two discs are superimposed so that a hole 36A of the top disc partially overlies a slot 33A and a hole 33B of the bottom disc to form passageways 37A and 37B and a hole 36B of the top disc partially overlies hole 33B and a slot 33C of the bottom disc to form passageways 37C and 37D.

A similar overlap takes place at each 45° interval but with alternate series of passageways being formed with the holes 36A and 36B being in the lower disc.

It will be seen the passageway 37A towards the periphery of the discs is of greater cross-section than passageways 37B and 37C in the mid-region of the discs and that passageway 37D towards the inner periphery of the discs is again of greater cross-section than passageways 37B and 37C.

Figure 2C:
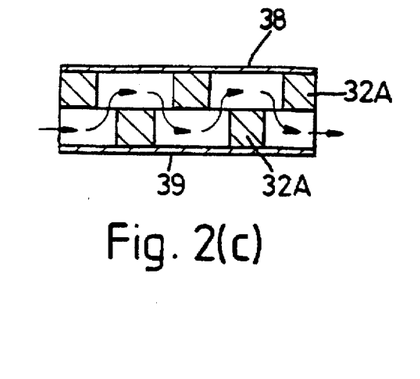
FIGS. 2c) and 2d) are identical sections along line A—A of FIG. 2b) with the addition of separator plates but showing flow in opposite directions.
Figure 2D:
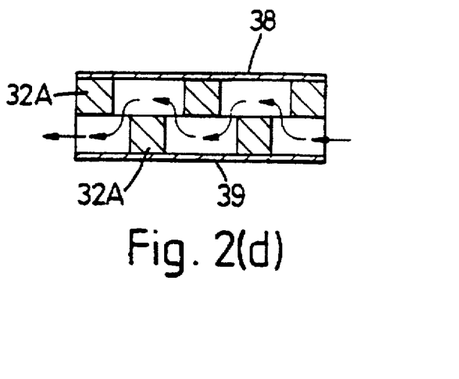

FIGS. 2c) and 2d) both show in section a stack of two discs 32A superimposed as shown in FIG. 2b) and with separator discs 38 and 39 to close off and define the top and bottom respectively of the passageways. As shown by arrows the flow may be from the inner periphery to the outer periphery—FIG. 2c) or from the outer periphery to the inner periphery—FIG. 2d).

Figure 3A:
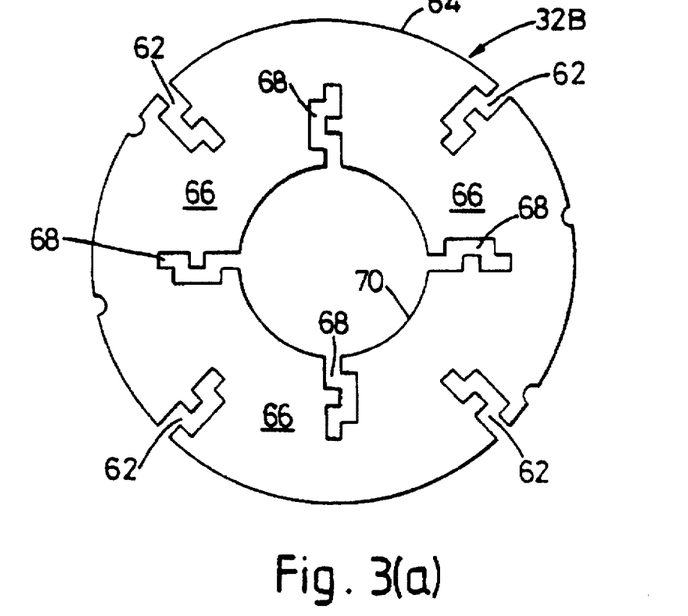
FIG. 3a) is a plan view of a disc according to a second aspect of the invention.

In FIG. 3a), disc 32B is shown having four equi-spaced passageways 62, each cut through the entire thickness of the disc and extending from the outer edge 64 of the disc to end in a central region 66 of the disc. The disc also has four equi-spaced passageways 68, each also cut through the entire thickness of the disc and extending from the inner edge 70 to the mid-region 66 of the disc. Each passageway 62 is positioned midway between an adjacent pair of passageways 68 and vice versa.

Figure 3B:
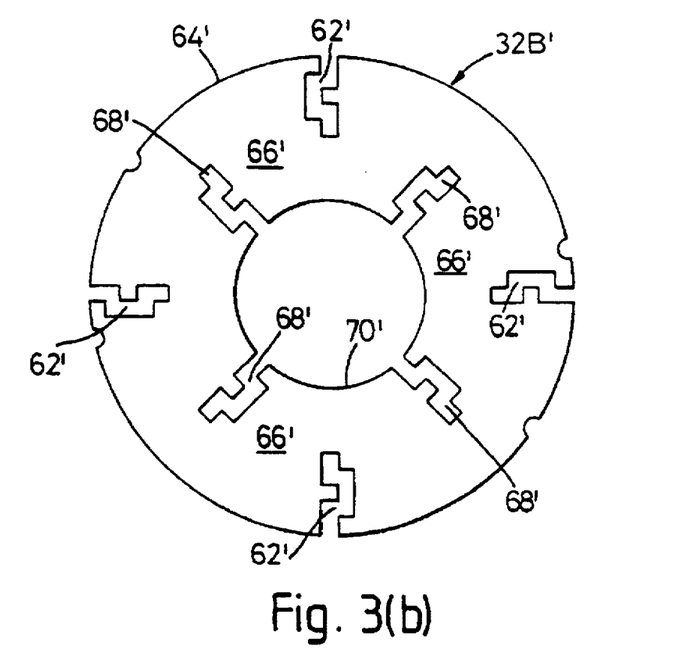
FIG. 3b) is a similar view of another disc as shown in FIG. 3a) but rotated through 45°.

In FIG. 3b) a similar disc 32B' is shown rotated through 45° with respect to disc 32B. Disc 32B' has the same arrangement of passageways 62' and 68' as has disc 32B and like parts are indicated by the same but prime numbers.

Figure 3C:
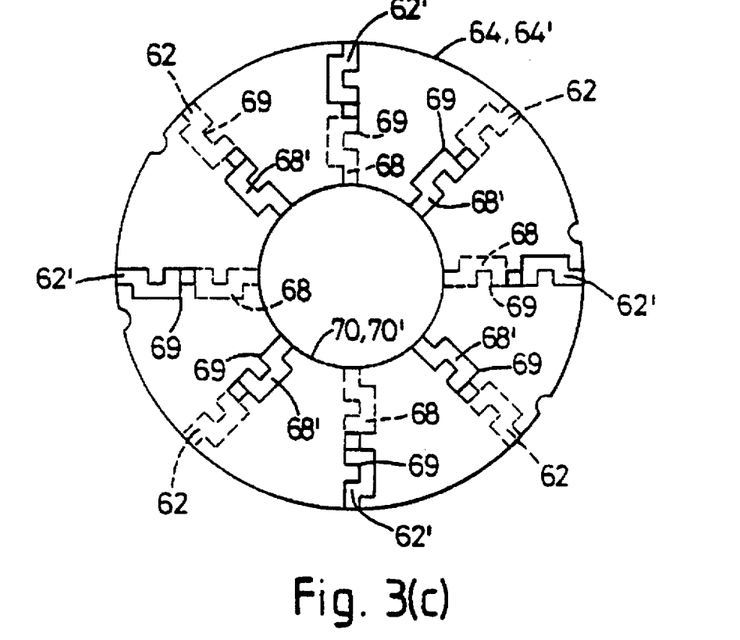
FIG. 3c) shows the two discs of FIGS. 3a) and 3b) superimposed one upon the other.

A pair of discs 32B and 32B' are abutted face to face with one of the discs rotated through 45° with respect to the other and this is shown in FIG. 3c). The mid-region end of each passageway 62 on disc 32B overlaps with the mid-region end of a passageway 68' on the other disc 32B' and similarly with passageways 62' and 68 thereby creating eight flow passageways between the outer edges 64, 64' and inner edges 70, 70' of the pair of discs.

As shown, each passageway 62, 68' or 62', 68 is provided with a number of right angle turns 69 to provide friction and energy loss for a fluid passing through the passageway.

Figure 3D:
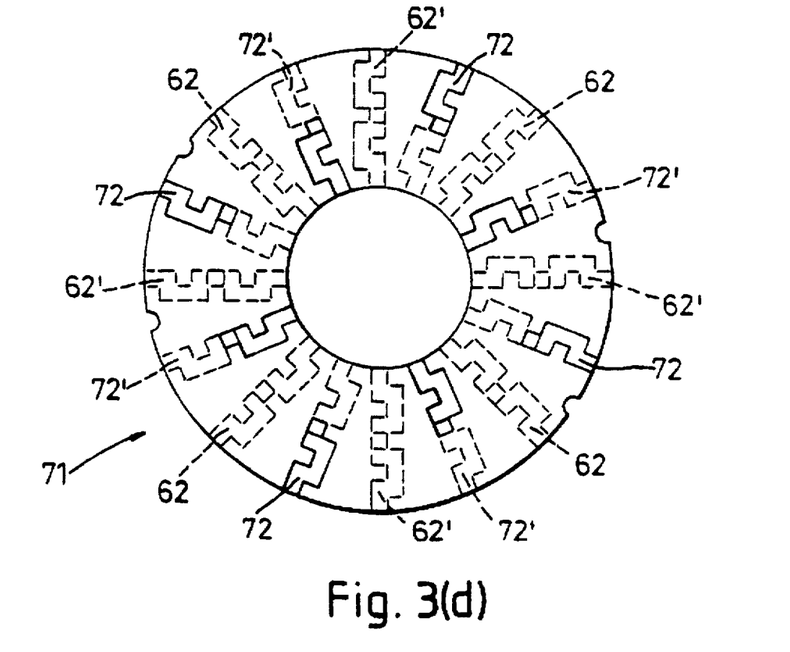
FIG. 3d) shows four discs of the type shown in FIGS. 3a) and 3b) superimposed on each other.

In FIG. 3d) is shown in plan a stack 71 of two pairs of discs, the discs of each pair being superimposed on each other in the manner shown in FIG. 3c) but each pair being rotated at 22½° with respect to the other pair. By this means passageways 72 and 72' in the upper pair are defined in between passageways 62 and 62' of the lower pair. It will be appreciated that each passageway from the outer to inner edges of the discs is isolated from adjacent passageways of that pair by the intervening areas of the discs and each passageway in one pair of discs is isolated from each passageway in an adjacent pair of discs by the abutting faces of adjacent discs.

Figure 4A:
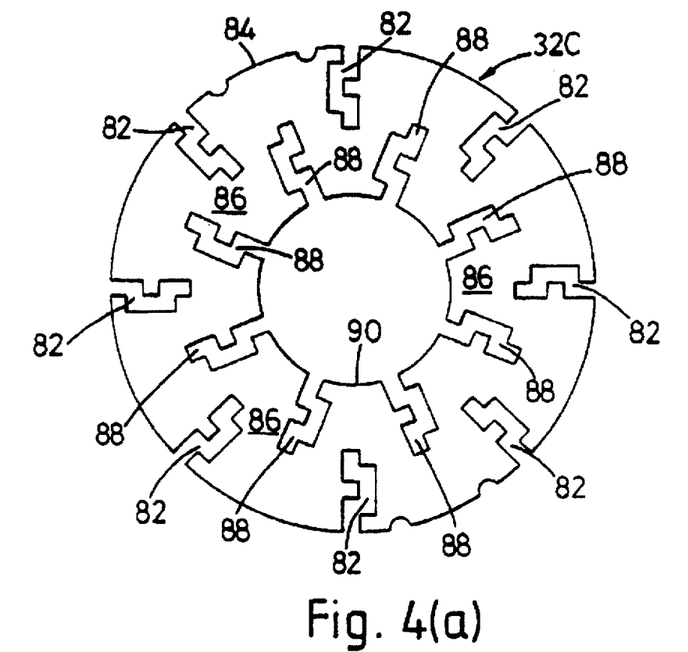
FIG. 4a) is a plan view of another disc according to the second aspect of the invention.

In FIG. 4a) a disc 32C has eight equi-spaced passageways 82, each cut through the entire thickness of the disc and extending from the outer edge 84 of the disc to end in a mid-region 86. The disc also has eight equi-spaced passageways 88 cut through the entire thickness of the disc and extending from the inner edge 90 to the mid-region 86 of the disc. Each passageway 82 is positioned midway between an adjacent pair of passageways 88 and vice versa.

Figure 4B:
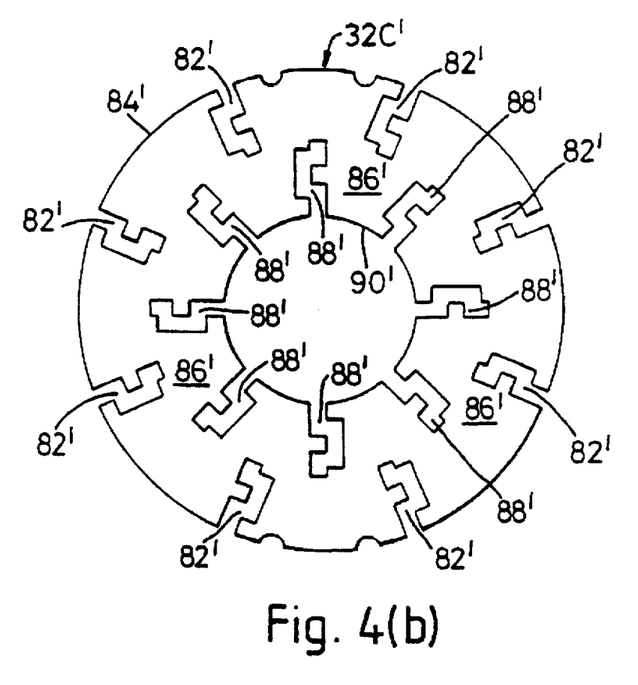
FIG. 4b) is a similar view of another disc as shown in FIG. 4a) but rotated through 22½°.

In FIG. 4b) a similar disc 32C' is shown rotated through 22½° with respect to the disc 32C. Disc 32C' has the same arrangement of passageways 82' and 88' as has disc 32C and like parts are indicated by the same but prime numbers.

Figure 4C:
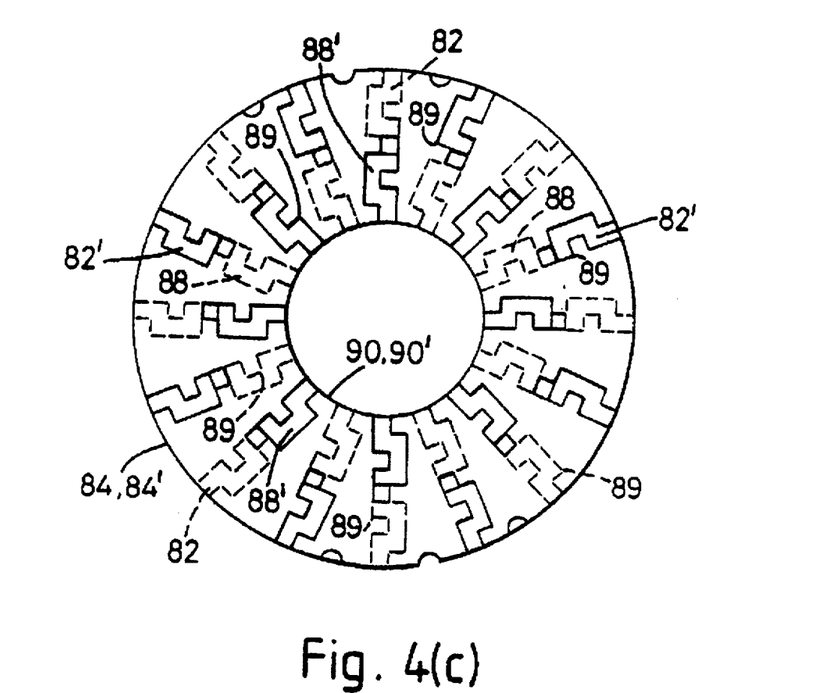
FIG. 4c) shows the two discs of FIGS. 4a) and 4b) superimposed one upon the other.

A pair of discs 32C and 32C' are abutted face to face with one of the discs rotated through 22½° with respect to the other and this is shown in FIG. 4c). The mid-region end of each passageway 82 on disc 32C overlaps with the mid-region end of a passageway 88' on the other disc and similarly with passageways 82' and 88 thereby creating sixteen flow passageways between the outer edges 84, 84' and 90, 90' of the pair of discs.

As shown each passageway 82, 88' or 82', 88 is provided with a number of right angle turns 89 as before.

Figure 4D:
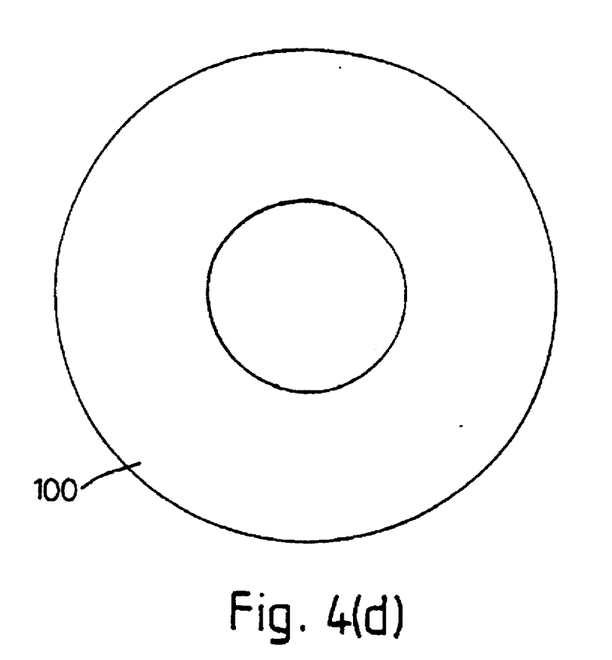
FIG. 4d) is a plan view of a separator plate to be used as described below in conjunction with the two stacked discs of FIG. 4c).

FIG. 4d) shows a plan view of an annular separator disc 100. One disc 100 can be located between each pair of superimposed discs 32C and 32C' in a stack of such pairs in order to maintain the flow passageways within their respective pairs of discs.

It will be appreciated that the invention is not limited to the embodiments shown. For example, in the FIGS. 3 and 4 embodiments, there may be more or less passageways as desired. The passageways may contain voids as described above.

The valve arrangement of FIG. 1 may be changed so that the fluid travels in the reverse direction, i.e. fluid inlets at 42 and outlets at 22 and 16.

The device may be utilised in a valve arrangement to control flow into and out of a fluid storage system.

I claim:

1. A fluid flow control device comprising a plurality of pairs of annular discs forming a rigid structure which incorporates a series of substantially radial passageways running from an inner edge to an outer edge of said annular discs for fluid flow, each disc of said pair having two major faces and passageways which extend completely through said disc between said major faces but extend only partially in a radial direction, the discs of each pair being substantially identical and being aligned with one another with a major face of one disc in direct abutment with a major face of the other disc such that the passageways in said one disc interconnect with the passageways in the other disc of the pair so as to provide for said fluid flow through the pair of substantially identical discs.

2. A fluid flow control device as claimed in claim 1 comprising a plurality of discs forming a rigid structure which incorporates a series of passageways for fluid flow, the discs having abutting surfaces and passageways therebetween for fluid flow;

inlet means formed in said discs to define a predetermined inlet area for conducting fluid to the series of passageways formed by said rigid structure, outlet means associated with said inlet means to provide a series of openings for exhausting fluid from the passageways, and wherein at least one of the passageways is of smaller cross-section in a mid-region of its respective discs and increases in cross-section from said mid-region towards the inlet and towards the outlet region of said discs.

3. A fluid flow control device as claimed in claim 2 in which the discs are annular and the passageways increase in cross-section from the mid-region of the annuli towards their inner and outer peripheries.

4. A fluid flow control device as claimed in claim 3 in which the discs of the superimposed pair are identical so that each disc has at least two different radially-extending series of holes and the discs are rotated relative to each other so that a first series of holes of one disc is superimposed on a second series of holes of the other disc and vice versa.

5. A fluid flow control device as claimed in claim 2 in which the discs are annular and the rigid annular stack so formed is adapted to receive a reciprocating valve plug which is moveable to increase or decrease the number of flow passageways available for fluid flow.

6. A fluid flow control device as claimed in claim 1 comprising a plurality of discs forming a rigid structure which incorporates a series of passageways for fluid flow, the discs having abutting surfaces and passageways therebetween for fluid flow, and wherein each disc has at least one first passsageway formed through the entire thickness of the disc and extending from the outer edge of the disc to end in a mid-region of the disc and at least one second passageway formed through the entire thickness of the disc and extending from the inner edge of the disc to end in a mid-region of the disc, adjacent pairs of discs being orientated so that each first passageway of one disc communicates with a second passageway of the other disc and each second passageway of said one disc communicates with a first passageway of said other disc.

7. A disc suitable for incorporation in a fluid flow control device as claimed in claim 6, the disc having at least one first passageway formed through the entire thickness of the disc and extending from the outer edge of the disc to end in a mid-region of the disc and at least one second passageway formed through the entire thickness of the disc and extending from the inner edge of the disc to end in a mid-region of the disc.

8. A fluid flow control device as claimed in claim 6 in which there are an even number of discs formed in pairs and each pair of discs may provide one or more passageways isolated from the passageways provided by other pairs of discs in the stack.

9. A fluid flow control device according to claim 6, in which each first passageway has a plurality of right angle turns in a plane parallel to the major faces of the discs, the first passageway connects to the second passageway via a turn in the axial direction of the discs and each second passageway has a plurality of right angle turns in a plane parallel to the major faces of the discs.

10. A fluid flow control device according to claim 1, in which a separator disc is positioned between adjacent pairs of identical discs.

* * * * *